UNITED STATES PATENT OFFICE.

EMILE HERZKA, OF ARECIBO, PORTO RICO, ASSIGNOR TO ABRAM I. KAPLAN, OF NEW YORK, N. Y.

PROCESS OF MANUFACTURING FERTILIZER CONTAINING POTASSIUM, NITROGEN, AND PHOSPHOROUS COMPOUNDS FROM MOLASSES REFUSE.

1,168,255.      Specification of Letters Patent.      Patented Jan. 11, 1916.

No Drawing.      Application filed January 25, 1915. Serial No. 4,365.

*To all whom it may concern:*

Be it known that I, EMILE HERZKA, a citizen of Austria-Hungary, residing at Arecibo, in the county of Arecibo and Island of Porto Rico, have invented new and useful Improvements in the Process of Manufacturing Fertilizer Containing Potassium, Nitrogen, and Phosphorous Compounds from Molasses Refuse, of which the following is a specification.

This invention relates to a process of manufacturing dry fertilizer from molasses refuse. According to my invention such refuse, which contains valuable potassium salts and nitrogenous compounds, is treated by a process which includes the addition of phosphates and the further treatment with sulfuric acid to produce a dry fertilizer.

I will now describe an example of my invention in its preferred form as follows:

The refuse which is left in the manufacture of alcohol from cane sugar molasses or beet sugar molasses of a specific gravity of 3° to 5° Baumé, is concentrated to 44° Baumé in a triple vacuum effect. The concentrated molasses refuse is then treated with from 30% to 50% of its weight of mineral phosphates, guano, or bone meal, all of which materials are rich in phosphate of calcium, and the resulting mixture is treated with sulfuric acid of 66° Baumé. After thorough mixing the mass is permitted to cool and after lying for some time, a dry fertilizer which can be spread very easily is produced. This fertilizer contains phosphates soluble in water, besides the potassium and nitrogen compounds which come from the molasses, and is rich in organic matter.

The choice of the particular phosphatic material to be used in the manufacture of the fertilizer is determined largely by the relative cost of mineral phosphate, guano or bone meal at the time and place of carrying on the process.

The phosphates are added in a finely ground state. The amount of sulfuric acid which is needed is determined by the quantity which is necessary to decompose the added phosphates and by the quantity necessary for changing the potassium carbonate of the concentrated molasses refuse into potassium sulfate.

When bone meal or guano containing nitrogen is used, the nitrogen content of the final product is increased.

I claim:

1. The process of manufacturing fertilizer containing potassium, nitrogen, and phosphoric acid out of molasses refuse, consisting in concentrating the molasses refuse in a triple vacuum effect to 44° Baumé and then adding 30% to 50% of the weight of mineral phosphates, and in treating the resulting mixture with sulfuric acid of 66° Baumé.

2. The process of manufacturing dry fertilizer from molasses refuse which consists in concentrating the refuse, adding phosphatic material, and treating the mixture with sulfuric acid.

3. The process of manufacturing dry fertilizer from molasses refuse which consists in concentrating the refuse, adding finely ground phosphatic material, and treating the mixture with sulfuric acid.

4. The process of manufacturing dry fertilizer which consists in taking concentrated molasses refuse, adding thereto a material rich in calcium phosphate and treating the resultant mixture with sulfuric acid.

5. The process of manufacturing dry fertilizer from molasses refuse which consists in concentrating the refuse, then adding from 30% to 50% of the weight of phosphate, and treating the mixture with a sufficient quantity of sulfuric acid to decompose the added phosphate and to change the potassium carbonate of the concentrated molasses refuse into potassium sulfate, substantially as described.

EMILE HERZKA.

Witnesses:
    MAURICE H. ESSER,
    EMILIO GARCÉS.